United States Patent
Adler et al.

(10) Patent No.: US 6,619,033 B2
(45) Date of Patent: Sep. 16, 2003

(54) METHOD FOR OPERATING A COMBUSTION ENGINE HAVING AN EXHAUST-GAS TURBOCHARGER

(75) Inventors: Holger Adler, Stuttgart (DE); Michael Lenz, Fellbach (DE); Thomas Liebscher, Fellbach (DE); Ulrich Merten, Leinfelden (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/886,738

(22) Filed: Jun. 21, 2001

(65) Prior Publication Data

US 2002/0002969 A1 Jan. 10, 2002

(30) Foreign Application Priority Data

Jun. 21, 2000 (DE) .......................................... 100 29 502

(51) Int. Cl.[7] .................................................. F01N 5/04
(52) U.S. Cl. .............................. 60/280; 60/274; 60/286; 123/300
(58) Field of Search .......................... 60/274, 280, 284, 60/285, 286, 601, 603, 606, 605.1; 123/299, 300, 383, 492, 27 R

(56) References Cited

U.S. PATENT DOCUMENTS

| | | | | |
|---|---|---|---|---|
| 4,233,815 A | * | 11/1980 | Melchior ...................... | 60/606 |
| 4,400,944 A | * | 8/1983 | Iwamoto et al. ............ | 60/605.1 |
| 4,424,676 A | * | 1/1984 | Meiners ...................... | 60/605.1 |
| 4,464,901 A | * | 8/1984 | Kobayashi et al. ............ | 60/606 |
| 4,674,283 A | * | 6/1987 | Ishida et al. .................. | 60/606 |
| 4,836,161 A | * | 6/1989 | Abthoff et al. .............. | 123/299 |
| 4,873,961 A | * | 10/1989 | Tanaka ......................... | 60/601 |
| 4,953,515 A | * | 9/1990 | Fehr et al. ................... | 123/383 |
| 4,962,742 A | * | 10/1990 | Nishizawa et al. .......... | 123/492 |
| 5,255,655 A | * | 10/1993 | Denz et al. .................. | 123/492 |
| 5,381,659 A | * | 1/1995 | Loving et al. ................ | 60/280 |
| 5,479,775 A | * | 1/1996 | Kraemer et al. ............. | 60/285 |
| 5,839,275 A | * | 11/1998 | Hirota et al. ................ | 60/285 |
| 5,956,942 A | * | 9/1999 | Sebastiano et al. .......... | 60/285 |
| 5,960,627 A | * | 10/1999 | Krampe et al. ............... | 60/286 |
| 5,979,398 A | * | 11/1999 | Yanagihara .................. | 123/299 |
| 6,412,276 B1 | * | 7/2002 | Salvat et al. .................. | 60/280 |

FOREIGN PATENT DOCUMENTS

| JP | 60-261941 | * 12/1985 |
|---|---|---|
| JP | 3-57850 | * 3/1991 |

* cited by examiner

Primary Examiner—Thomas Denion
Assistant Examiner—Tu M. Nguyen
(74) Attorney, Agent, or Firm—Kenyon & Kenyon

(57) ABSTRACT

In a method for operating a combustion engine having an exhaust-gas turbocharger, it is possible to switch over between a normal operation and a special operation. In the special operation, at least one main fuel injection and at least one secondary fuel injection are provided. In response to a positive load jump, a switch-over between the normal operation and the special operation provided for increasing the exhaust gas enthalpy is performed, the secondary fuel injection in the special operation being adjusted so that it substantially burns in the combustion chamber and causes an increase in the exhaust gas enthalpy as well as an adjustment of a rich or a lean exhaust gas composition. The method according to the present invention may be used, for example, in a motor vehicle having a diesel engine.

8 Claims, 2 Drawing Sheets

METHOD FOR OPERATING A COMBUSTION ENGINE HAVING AN EXHAUST-GAS TURBOCHARGER

FIELD OF THE INVENTION

The present invention relates to a method for operating a combustion engine having an exhaust-gas turbocharger, in which it is possible to switch between normal operation and special operation, and at least one main fuel injection and at least one secondary fuel injection are provided in special operation.

BACKGROUND INFORMATION

A method for operating a combustion engine, in which a change is made possible between lean operation and rich operation in a diesel engine, is described in German Published Patent Application No. 197 50 226. The switch to lean operation or rich operation of the diesel engine occurs depending on predetermined switching criteria. Separate mappings for the operation of the diesel engine are stored for lean operation and for rich operation.

A method for operating a combustion engine having an exhaust-gas turbocharger, in which it is possible to switch between normal operation and special operation, the special operation being used to reduce turbo lag for a diesel engine with an exhaust-gas turbocharger, is described in German Published Patent Application No. 199 51 096. In response to a positive load jump, the switch-over to special operation is made in which the exhaust gas temperature and/or the exhaust gas pressure, upstream of the exhaust-gas turbocharger, is/are increased relative to normal operation. In special operation, a main fuel injection and a secondary fuel injection can be provided, enabling an essentially complete combustion of the fuel of the secondary injection quantity. During special operation, the diesel engine is operated stoichiometrically or hyperstoichiometrically, i.e., lean, if it is provided with an emissions control system.

Modern emissions control systems require a change-over of the exhaust gas composition from rich to lean. Compared to a normally lean combustion, a rich combustion is necessary from time to time, for example, in order to regenerate $NO_x$ adsorber systems.

To also be able to take measures for avoiding the so-called turbo lag during these regeneration phases without interfering with the regeneration process, it should also be possible to adjust the exhaust gas composition optionally to lean or rich, when these measures are in progress.

SUMMARY

It is an object of the present invention to enable an accelerated build-up in charge-air pressure for a combustion engine with an exhaust-gas turbocharger while optionally adjusting a rich or lean exhaust gas composition at the same time.

According to one aspect of the present invention, a method is provided in which in reaction to a positive load jump, a switch occurs between normal operation and special operation, provided for increasing the exhaust gas enthalpy, the secondary fuel injection in the special operation being adjusted so that it burns substantially in the combustion chamber and causes an increase in exhaust gas enthalpy as well as an adjustment of a rich or lean exhaust gas composition.

The secondary injection, burned in the combustion chamber, contributes to the engine load and results in an increase in exhaust gas enthalpy. At the same time, an adjustment of the exhaust gas composition between rich and lean may be made with the aid of the secondary fuel injection. The quantity and instant of the secondary fuel injection are important adjustment parameters for engine load, increase in the exhaust gas enthalpy, and adjustment of the exhaust gas composition.

Turbochargers utilize the exhaust gas enthalpy to drive a compressor on the fresh air side. After a sudden positive load variation, the turbocharger must be accelerated. The exhaust gas enthalpy necessary may not be made available immediately with conventional operating methods, since it is limited by the smoke limit. The method of the present invention produces a higher exhaust gas enthalpy at the same smoke value and thus accelerates the charge-air pressure build-up, i.e., it reduces the turbo lag.

The above and other beneficial objects of the present invention are also achieved by providing a method in which in response to a positive load jump, a switch-over occurs between the normal operation and the special operation provided for increasing the exhaust gas enthalpy, the secondary fuel injection in the special operation being adjusted so that it burns substantially in the combustion chamber and causes an increase in the exhaust gas enthalpy and that in the special operation at least one additional offset secondary injection of fuel is provided via which a setting of a rich or lean exhaust gas composition essentially occurs.

By the provision of an additional offset secondary injection following the secondary injection burned in the combustion chamber, more flexible and precise possibilities for adjusting the engine load, exhaust gas enthalpy, and exhaust gas composition are achieved. For setting a lean or rich exhaust gas composition, the quantity and instant of the secondary injection burned in the combustion chamber, for example, which affect the engine load, need not be changed. Rather, it is sufficient to change the quantity and instant of the offset secondary injection.

In normal and special operation, depending on the operating state of the combustion engine, a pre-injection of fuel may be performed, the start of injection of which may be substantially the same in normal and in special operation.

A start of the main injection may be substantially the same in normal and in special operation.

Because the start of a pre-injection of fuel and a main injection of fuel substantially does not change between normal and special operation, a maximum pressure rise in the combustion chamber and a position of maximum pressure rise in the combustion chamber remain substantially the same between normal and special operation. Thus, a switch between normal and special operation is imperceptible and inaudible to a driver of a motor vehicle in which the combustion engine is operated in accordance with the method of the present invention.

A switching time between normal operation and special operation and a main injection quantity during the switchover time may be adjusted as a function of an engine torque, a derivation of the engine torque, an engine speed, a derivation of the engine speed, a road speed, an engaged gear, a total injection quantity, an air mass in the intake-tract length, a derivation of the air mass, a water temperature in the cooling system, an outside air temperature, an intake manifold temperature, an exhaust gas temperature, an ambient pressure, an intake manifold pressure, and/or an exhaust gas pressure.

These measures permit a slow or fast switch-over between normal and special operation, so as to ensure that the switching procedure is almost imperceptible to a driver despite a rapid build-up in charge-air pressure.

DETAILED DESCRIPTION

Figure 1:
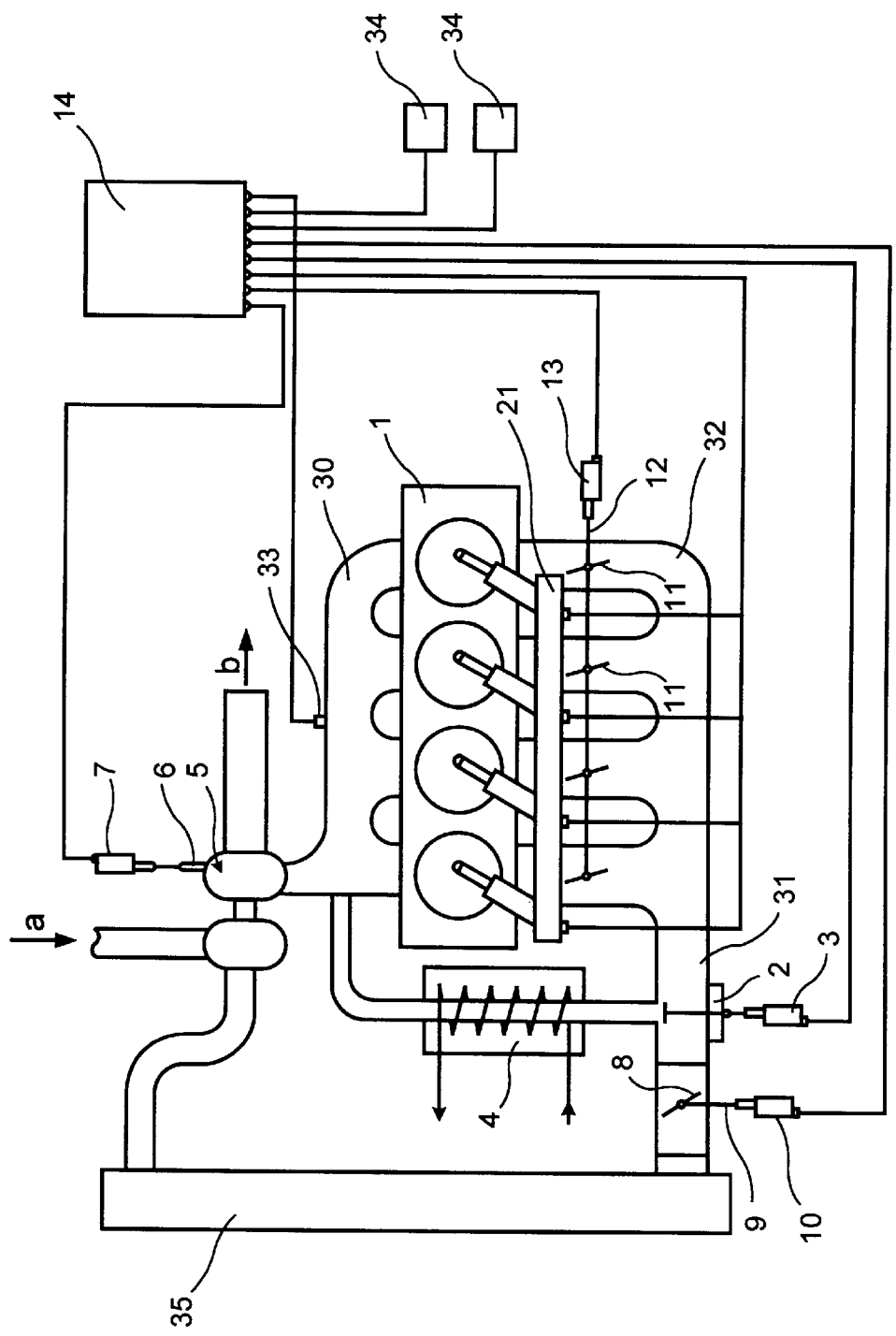
FIG. 1 is a schematic view of a diesel engine having an exhaust-gas turbocharger and an engine management for implementing the method according to the present invention.

Diesel engine 1, illustrated in FIG. 1, may be optionally operated in hypostoichiometric operation, i.e., a combustion air ratio $\lambda < 1$ or rich combustion, or in stoichiometric or hyperstoichiometric operation, i.e., a combustion air ratio $\lambda \geq 1$ or lean combustion.

Arranged between an exhaust pipe 30 and an intake air line 31 is an exhaust-gas recirculation device which includes a control element 2. Control element 2 may be activated by a servo-actuated actuator 3 as a function of signals from an electronic engine management. An exhaust-gas recirculation cooler 4 is provided in the exhaust-gas recirculation line.

The diesel engine is equipped with a pressure-charging device, an exhaust-gas turbocharger 5. Exhaust-gas turbocharger 5 includes a control element 6, with which the exhaust back pressure, the cross-section traversed by flow and/or the volume of the exhaust gas flowing through may be adjusted. For this purpose, control element 6 is provided with a servo-actuated actuator 7, which may be configured as an electric actuator. The servo-actuated actuator is activated by signals from the electronic engine management. The fresh air, which enters at a and is compressed by turbocharger 5, is directed via an intercooler 35. Exhaust gas from exhaust-gas turbocharger 5 enters an emissions control system in the direction of arrow b.

In the intake-tract length, upstream of the exhaust-gas recirculation device, a throttle device 8 is arranged in the intake-air line, which may be actuated by a control element 9. Servo-actuated actuator 10, which may also be actuated as a function of signals from the electronic engine management, is assigned to control element 9.

Diesel engine 1 includes a system for reducing the inlet cross section, which in the present system is designed as a throttle valve 11 in intake tract 32 of each individual cylinder. A common control element 12, which may be actuated by a servo-actuated actuator 13, is assigned to throttle valves 11. Throttle valves 11 are actuated as a function of signals from electronic engine management 14.

A switch-over from lean combustion to rich combustion may be implemented by electronic engine management 14. The switch-over from normal operation to special operation may also be performed by engine management 14 in order to produce a high exhaust gas enthalpy and a high exhaust gas temperature. By switching to special operation, the so-called turbo lag in response to a sudden positive load variation is avoided.

A rich combustion may be achieved by engine management 14 in that an injection characteristic is changed so that an advanced combustion of the injected fuel quantity is achieved, and that a concomitantly burning secondary injection into the combustion chamber is provided, the quantity and the instant being matched to the engine operation.

As an option, the diesel engine may be provided with a fuel injection 33 into the exhaust system, the injection being controllable in quantity and instant independently of the engine operation. Sensors 34 supply signals, for example, pressure and temperature, to engine management 14.

A transition from a lean to a rich combustion occurs through a continuous or discontinuous decrease in the quantity of the at least one main injection and a quantity of the concomitantly burning secondary injection adapted thereto such that the indicated torque remains constant. Conversely, a transition from a rich to a lean combustion occurs through a continuous or discontinuous increase in the quantity of the at least one main injection and a quantity of the concomitantly burning secondary injection adapted thereto such that the indicated torque remains constant.

In the engine control through engine management 14, two types of engine operation, one for normal operation and one for special operation, are mapped. For one type of engine operation, the normal operation, the application for the conventional, normal combustion position is recorded, and in the mapping structure for the second type of engine operation, the special operation, an application with a plurality of injections is mapped, which enables both a hyperstoichiometric and a hypostoichiometric engine operation.

Figure 2:
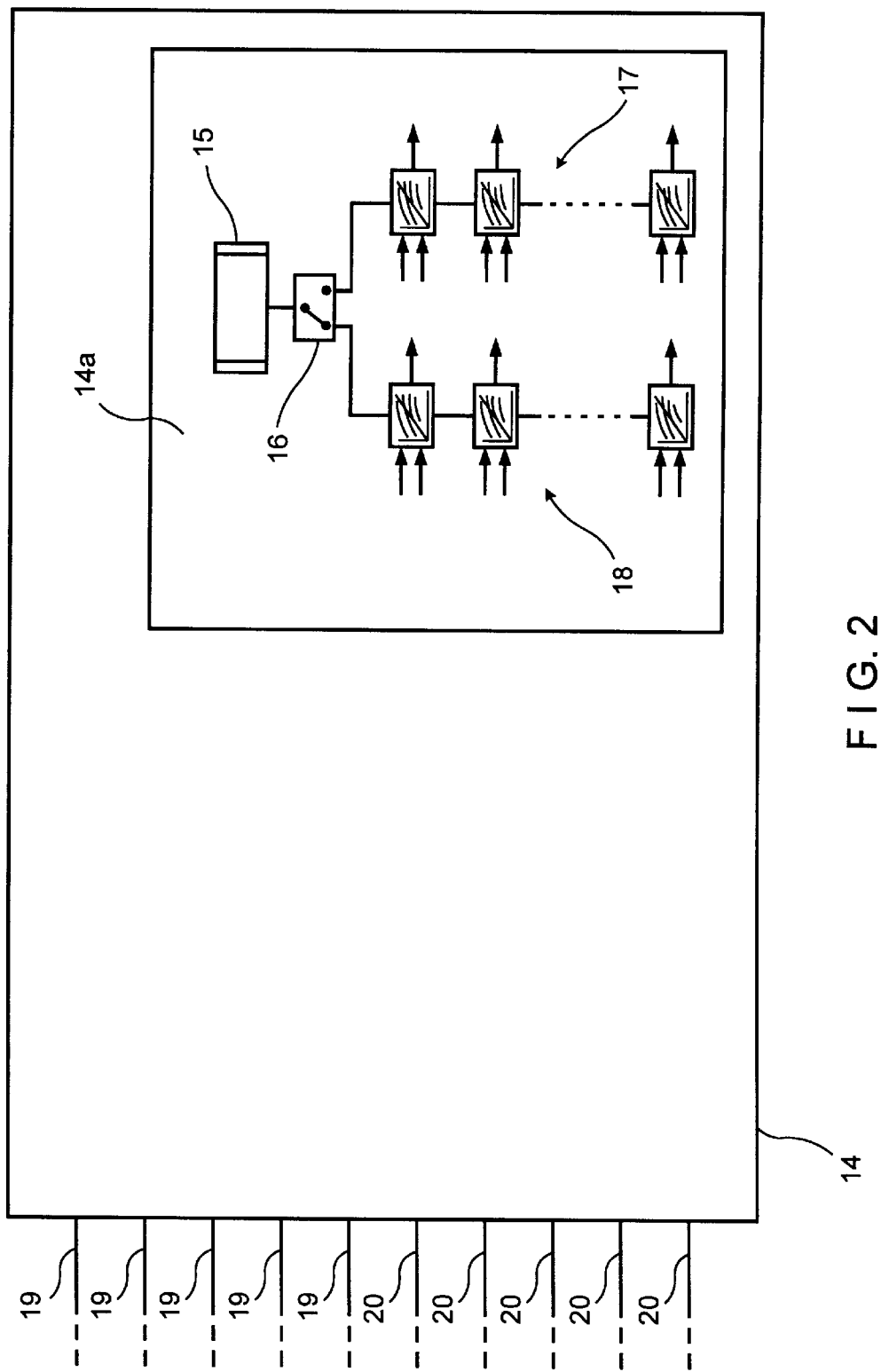
FIG. 2 is a schematic view of the structure of the engine management illustrated in FIG. 1.

As illustrated in FIG. 2, engine management 14 includes a unit 14a, by which the switch-over between lean engine operation and rich engine operation may be achieved. In unit 14a, program maps 17 for rich engine operation and program maps 18 for lean engine operation are stored. In a block 15, switching criteria are tested, and then either a rich or a lean engine operation is adjusted by a selector switch 16.

Lines 19 provide sensor signals to engine management 14, which are used to test the switching criteria in block 15. The sensor signals on lines 19 are also used by engine management 14 to determine whether a positive load jump is present and whether a switch-over to special operation to increase the exhaust gas enthalpy is required. Engine management 14 sends appropriate signals via lines 20 to an injection unit 21 and other actuators illustrated in FIG. 1.

According to the present invention, a switch-over between normal and special operation occurs based upon criteria described, for example, in German Published Patent Application No. 199 51 096. As the switching criteria under which the engine management implements a short-term switch-over from normal operation to special operation, such as in accordance with a particular position of the accelerator pedal, for example, which may be different from a so-called "kick-down position" conventional in vehicles with automatic transmission. Other signals of an engine management that correlate with the driver's desire for acceleration, may also be evaluated as switching criteria. For example, these may be signals for a change in the position of the accelerator pedal and/or for a change in the quantity of fuel supplied for combustion within a certain time and/or signals for the difference between a quantity of fuel desired by the driver and a quantity of fuel released by the engine management. The switch-over criteria for switching to special operation may be selected so that the driver may achieve a normal acceleration in normal operation, e.g., by light pressure on the accelerator pedal, and produce high acceleration with switch-over to special operation by a correspondingly stronger pressure on the accelerator pedal. Switching back to normal operation is effected, for example, by a time-lag switch that initiates a switch-over to normal operation after a predetermined time period, e.g., after one second. The switching back to normal operation may also be made dependent on reaching a predetermined setpoint for charge-air pressure, in particular one that has been recorded as a performance parameter.

The method according to the present invention may be characterized in that the entire fuel quantity is introduced into the combustion chamber through an optional number of pre-injections, one to two main injections, a concomitantly burning secondary injection, and possibly an additional offset secondary injection. In the method according to the present invention, the starts of the pre-injections correspond essentially to the starts of the pre-injections in normal diesel engine combustion. The starts of the main injection(s) in the method according to the present invention correspond substantially to the starts of the main injections in normal diesel engine combustion.

The start of the first secondary injection is designed so that a combustion of this secondary injection quantity occurs in the combustion chamber, so that the first secondary injection contributes to the delivered engine load and causes a very high exhaust gas temperature.

Furthermore, the combustion may be designed to be optionally hyperstoichiometrical and hypostoichiometrical via the first secondary injection. The additional offset secondary injection may also be used for the hyperstoichiometric or hypostoichiometric design of the combustion, if necessary.

In this combustion method, the maximum pressure rise in the combustion chamber and the position of the maximum pressure rise in the combustion chamber correspond approximately to the values during normal diesel engine combustion with pre- and main injection. The engine load is controlled via the injection quantity that participates in the combustion.

According to the present invention, in the case of the diesel engine an intake manifold pressure control is provided with the aid of the engine management, the control being implemented via throttle valves 11, exhaust-gas turbocharger 5, and optionally by exhaust gas recirculation valve 2 and exhaust-gas turbocharger 5. In addition, an air-mass control may also be provided by an air-mass sensor and exhaust gas recirculation valve 2, optionally by throttle valves 8 and 11.

The air ratio is controlled by exhaust gas recirculation valve 2 and by the secondary injection that substantially burns in the combustion chamber, and if necessary, by the additional offset secondary injection.

In order to achieve a load-neutral transition between normal and special operation, the air path is continuously adjusted before the injection measures are initiated. In the entire operating range all control elements are continuously corrected, depending on the system deviations. This arrangement allows a satisfactory non-steady behavior to be implemented.

According to the present invention, a switch-over between normal and special operation may not occur abruptly. Rather transition time and a characteristic of the main injection quantity during the transition time are dependent on one or more of the following parameters:

engine torque and its derivation,
engine speed and its derivation,
road speed,
gear,
total injection quantity,
air mass and its derivation,
water temperature,
outside air temperature,
intake manifold temperature,
exhaust gas temperature,
atmospheric pressure,
intake manifold pressure, and
exhaust gas pressure.

Varying the speed of switching between normal and special operation and suitable adaptation of the main injection quantity during the switch-over may result in the switch-over process being imperceptible or barely perceptible to the driver. However, a rapid build-up in charge-air pressure is possible, so that turbo lag is avoided.

In addition to the previously described criteria for switching between normal and special operation, a switch-over from normal to special operation and back is dependent on one or more of the following parameters:

limit torque and limit quantity,
pedal sensor and its derivation,
desired engine torque and its derivation,
engine torque and its derivation,
engine speed and its derivation,
road speed,
gear,
total injection quantity,
air mass and its derivation,
water temperature,
outside air temperature,
intake manifold temperature,
exhaust gas temperature,
atmospheric pressure,
actual intake manifold pressure,
desired intake manifold pressure,
exhaust gas pressure, and
type of driver.

The method according to the present invention may yield an accelerated charge-air pressure build-up in a combustion engine having an exhaust-gas turbocharger, by increasing the exhaust gas enthalpy through a secondary injection which substantially burns in the combustion chamber. Since this first secondary injection burns substantially in the combustion chamber, it also contributes to the engine load. By increasing the exhaust gas enthalpy, the exhaust turbine of the exhaust-gas turbocharger may be brought up to speed faster, so that charge-air pressure is also built up faster in the intake-tract length. This avoids the so-called turbo lag in response to positive load variation.

According to the first example embodiment of the present invention, a rich or a lean exhaust gas composition may also be adjusted by the secondary injection that substantially burns in the combustion chamber. In this way, regeneration phases of an emission control system, which require a rich exhaust gas composition, are not interrupted or impaired, despite the turbocharger compensation.

According to the second example embodiment of the present invention, a further improvement results from the fact that in addition to the secondary injection that substantially burns in the combustion chamber, an additional offset secondary injection is provided. A rich or a lean exhaust gas composition may substantially be adjusted by this additional offset secondary injection. According to the second example embodiment of the present invention, therefore, a rich or a lean exhaust gas composition is substantially adjusted exclusively by the additional offset secondary injection. In this manner, the instant and the quantity of the first secondary injection that substantially burns in the combustion chamber may remain at the values optimum for the existing engine operating state.

What is claimed is:

1. A method for operating a combustion engine having an exhaust-gas turbocharger, comprising the step of:

switching between a first operation prior to a positive load jump and a special operation, the special operation including at least one main injection of a fuel and at least one secondary injection of the fuel;

wherein in response to the positive load jump, the switching between the first operation and the special operation includes the substeps of:

increasing exhaust gas enthalpy; and adjusting the secondary fuel injection in the special operation so that the secondary fuel injection substantially burns in a combustion chamber and causes an increase in the exhaust gas enthalpy and an adjustment of one of a rich and a lean exhaust gas composition.

2. The method according to claim 1, wherein as a function of an operating state of the combustion engine, the first operation and the special operation include a fuel pre-injection, a start of the fuel pre-injection being substantially identical in the first operation and the special operation.

3. The method according to claim 1, wherein a start of the main injection is substantially identical in the first operation and the special operation.

4. The method according to claim 1, wherein a switch-over time between the first operation and the special operation and a main injection quantity during the switch-over time are adjusted as a function of at least one of: an engine torque; a derivation of the engine torque; an engine speed; a derivation of the engine speed; a road speed; an engaged gear; a total injection quantity; an air mass in an intake-tract length; a derivation of the air mass; a water temperature in a cooling system; an outside air temperature; an intake manifold temperature; an exhaust gas temperature; an ambient pressure; an intake manifold pressure; and an exhaust gas pressure.

5. A method for operating a diesel engine having an exhaust-gas turbocharger, comprising the steps of:

switching between a first operation prior to a positive load jump and a special operation, the special operation including at least one main fuel injection of a fuel, at least one secondary fuel injection of the fuel and at least one additional offset secondary fuel injection; and effecting an adjustment of one of a rich exhaust gas composition and a lean exhaust gas composition in accordance with the at least one additional offset secondary fuel injection;

wherein in response to the positive load jump, the switching between the first operation and the special operation includes the substeps of:

increasing exhaust gas enthalpy; and adjusting the secondary fuel injection in the special operation so that the secondary fuel injection substantially burns in a combustion chamber and causes an increase in the exhaust gas enthalpy.

6. The method according to claim 5, wherein as a function of an operating state of the combustion engine, the first operation and the special operation include a fuel pre-injection, a start of the fuel pre-injection being substantially identical in the first operation and the special operation.

7. The method according to claim 5, wherein a start of the main injection is substantially identical in the first operation and the special operation.

8. The method according to claim 5, wherein a switch-over time between the first operation and the special operation and a main injection quantity during the switch-over time are adjusted as a function of at least one of: an engine torque; a derivation of the engine torque; an engine speed; a derivation of the engine speed; a road speed; an engaged gear; a total injection quantity; an air mass in an intake-tract length; a derivation of the air mass; a water temperature in a cooling system; an outside air temperature; an intake manifold temperature; an exhaust gas temperature; an ambient pressure; an intake manifold pressure; and an exhaust gas pressure.

* * * * *